(12) United States Patent
Cohen

(10) Patent No.: US 6,371,390 B1
(45) Date of Patent: Apr. 16, 2002

(54) DRIP IRRIGATION HOSE AND METHOD OF MAKING SAME

(76) Inventor: Amir Cohen, Yuvalim, 20142 Doar Na Gush Segev (IL)

( * ) Notice: Subject to any disclaimer, the term of this patent is extended or adjusted under 35 U.S.C. 154(b) by 0 days.

(21) Appl. No.: 09/639,768

(22) Filed: Aug. 21, 2000

(51) Int. Cl.$^7$ ................................................ B05B 15/00
(52) U.S. Cl. .................. 239/542; 239/547; 239/533.13; 239/533.1; 239/568; 239/450
(58) Field of Search ................. 239/542, 450, 239/547, 533.13, 533.1, 568; 138/26, 42–46, 28

(56) References Cited

U.S. PATENT DOCUMENTS

| | | | | |
|---|---|---|---|---|
| 4,642,152 A | * | 2/1987 | Chapin | 156/203 |
| 4,880,167 A | * | 11/1989 | Langa et al. | 239/542 |
| 5,375,770 A | * | 12/1994 | Roberts | 239/533.13 |
| 5,400,973 A | * | 3/1995 | Cohen | 239/542 |
| 5,458,712 A | * | 10/1995 | DeFrank | 156/203 |
| 5,732,887 A | * | 3/1998 | Roberts | 239/542 |
| 5,785,785 A | * | 7/1998 | Delmer et al. | 239/542 |

* cited by examiner

*Primary Examiner*—James Hook
*Assistant Examiner*—Dinh Q. Nguyen

(57) ABSTRACT

A drip irrigation hose formed with a plurality of outlets for discharging the water at longitudinally-spaced locations along the length of the hose includes a plurality of emitter elements secured to the hose at longitudinally-spaced locations along its length to define a plurality of turbulent flow passageways each in communication with the interior of the hose for discharging water from a hose outlet at a slow rate. Each of the turbulent flow passageways is defined by a relatively elastic first material coextruded with a relatively stiff second material different from the first material, such that the relatively elastic material is pressure-deformable as compared to the relatively stiff material to change the turbulent flow of each emitter element in response to the pressure of the water in the hose at the respective emitter element.

51 Claims, 18 Drawing Sheets

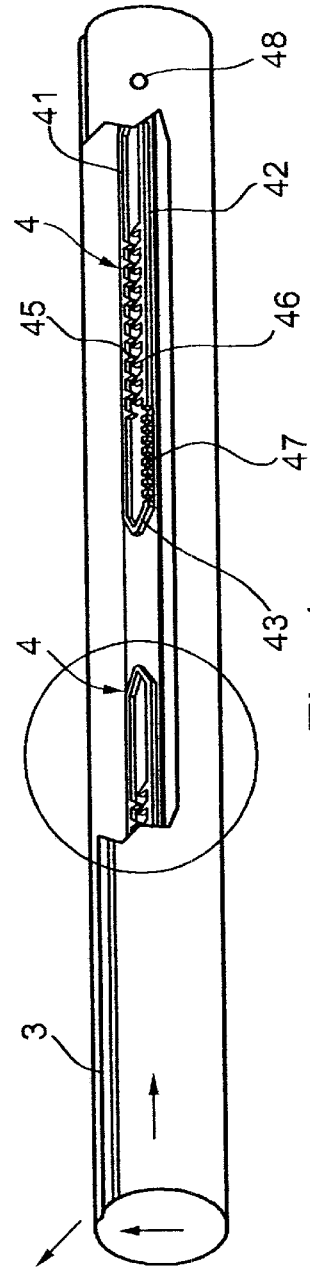
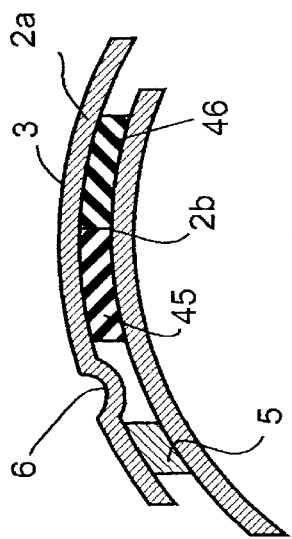
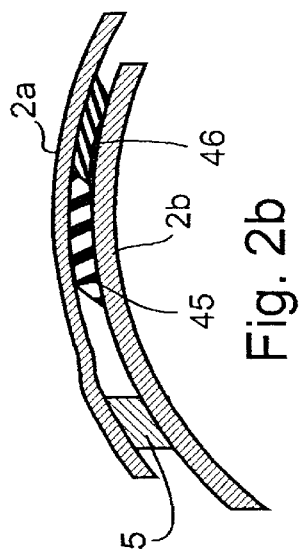
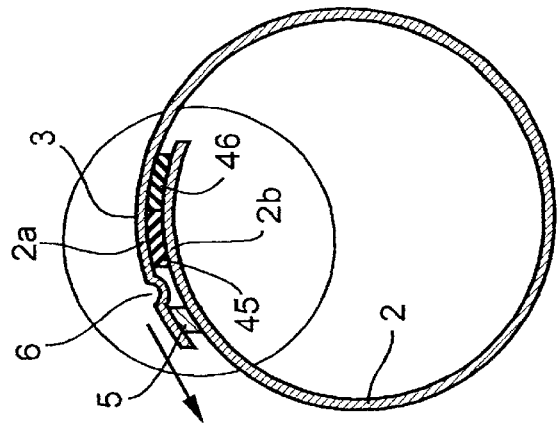
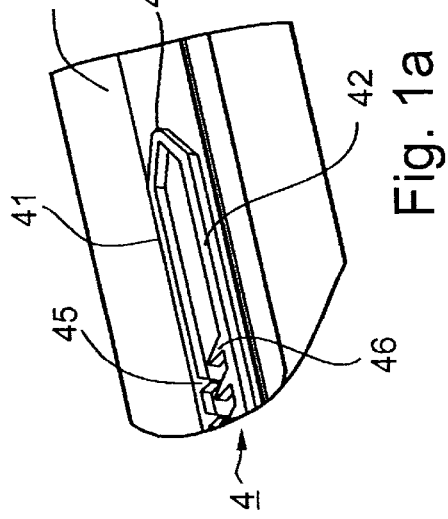

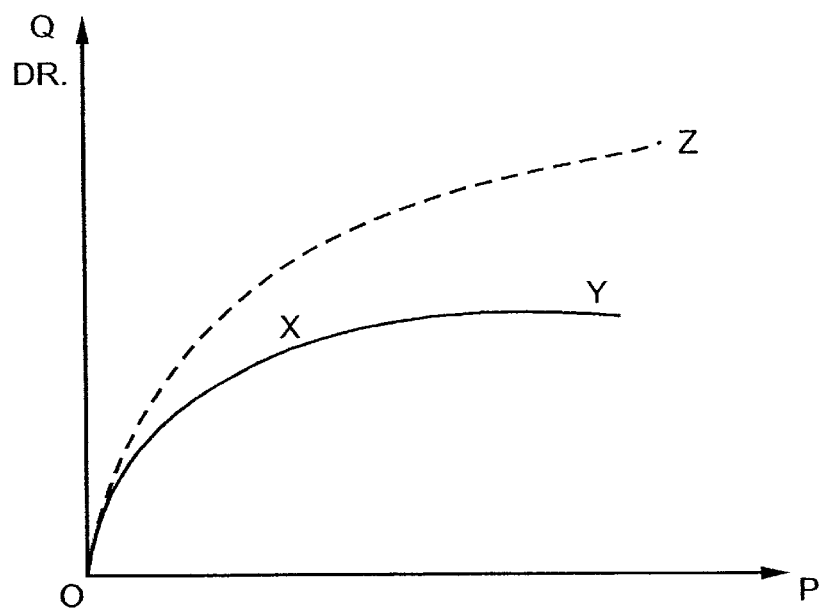
Fig. 3
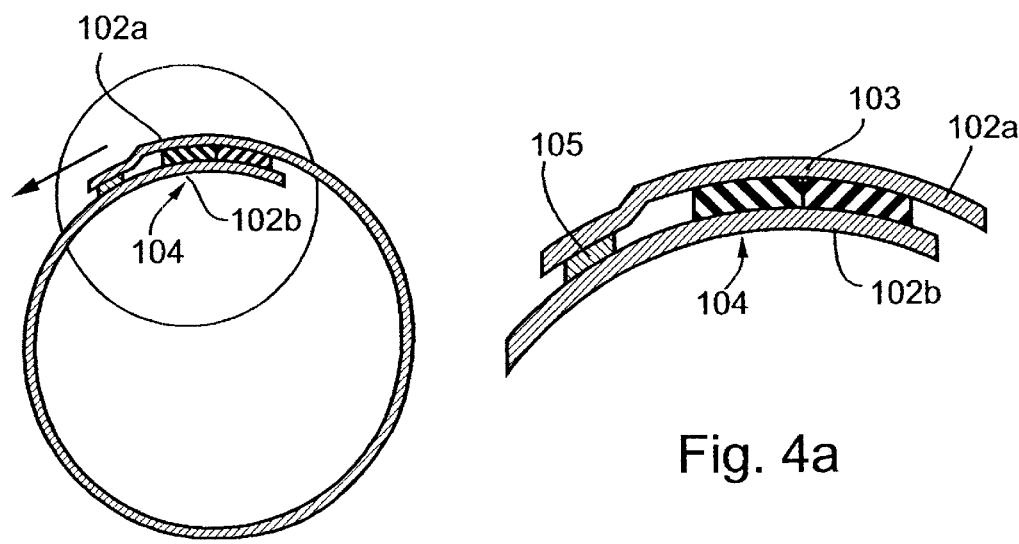
Fig. 4
Fig. 4a

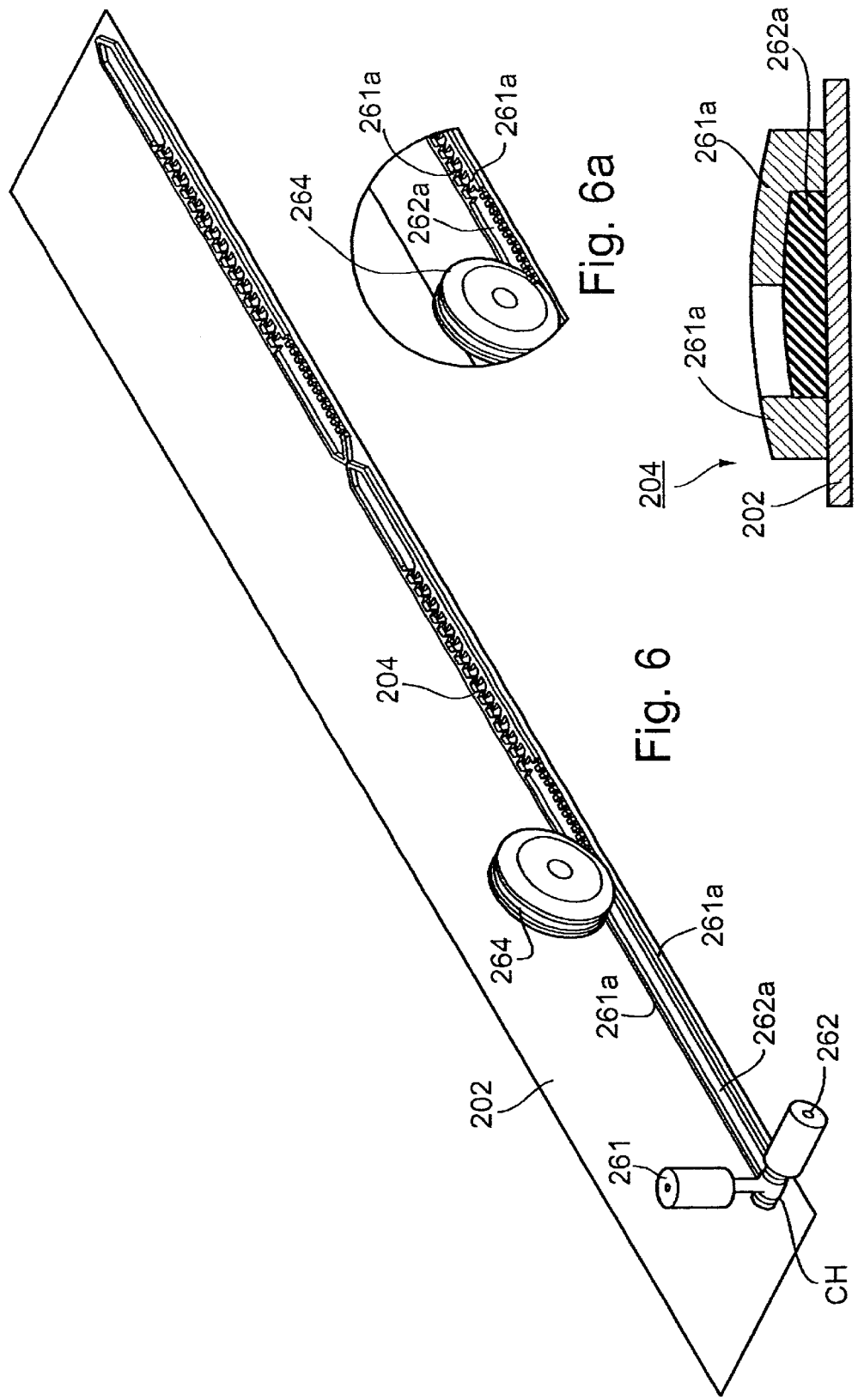

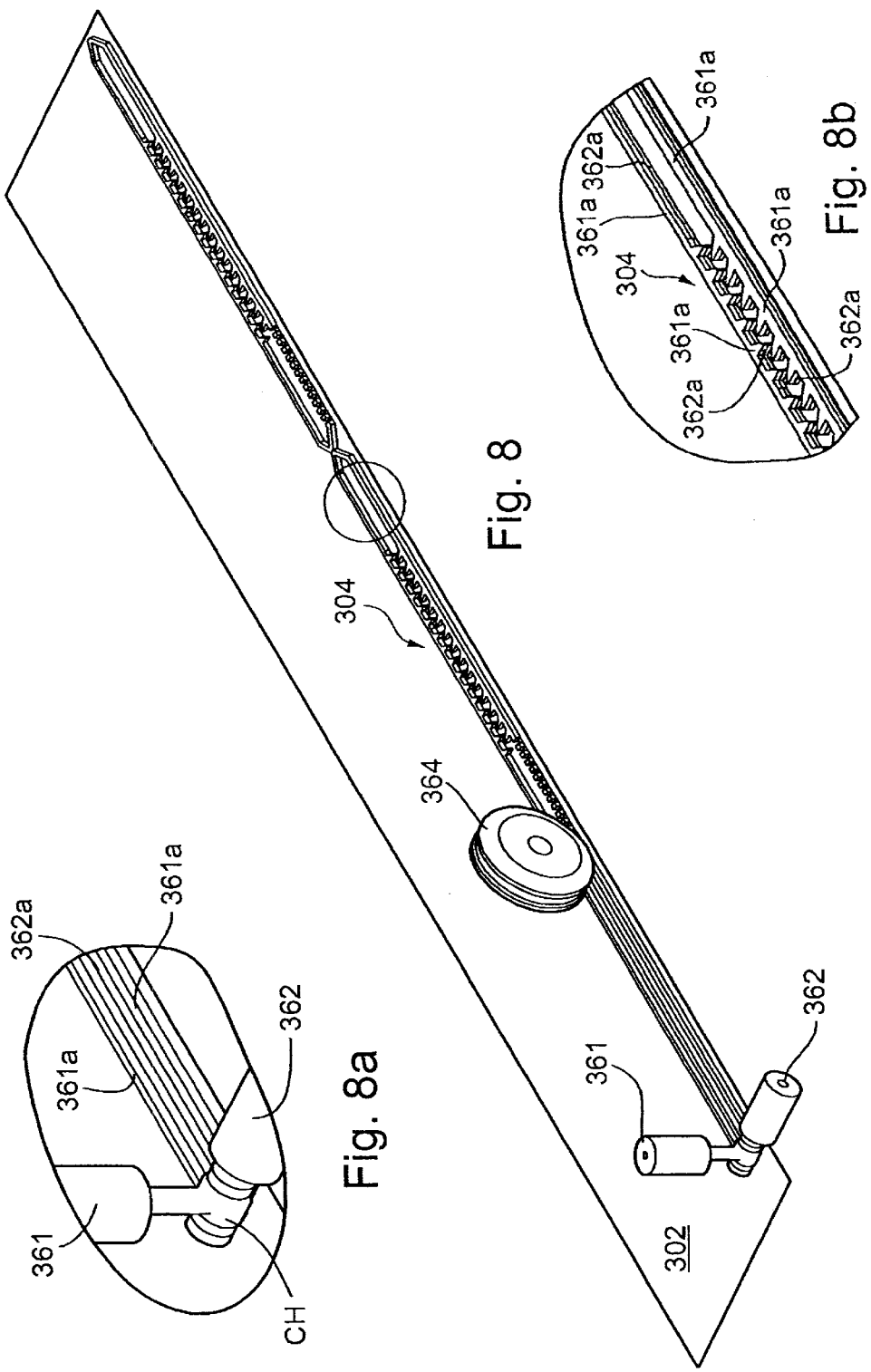

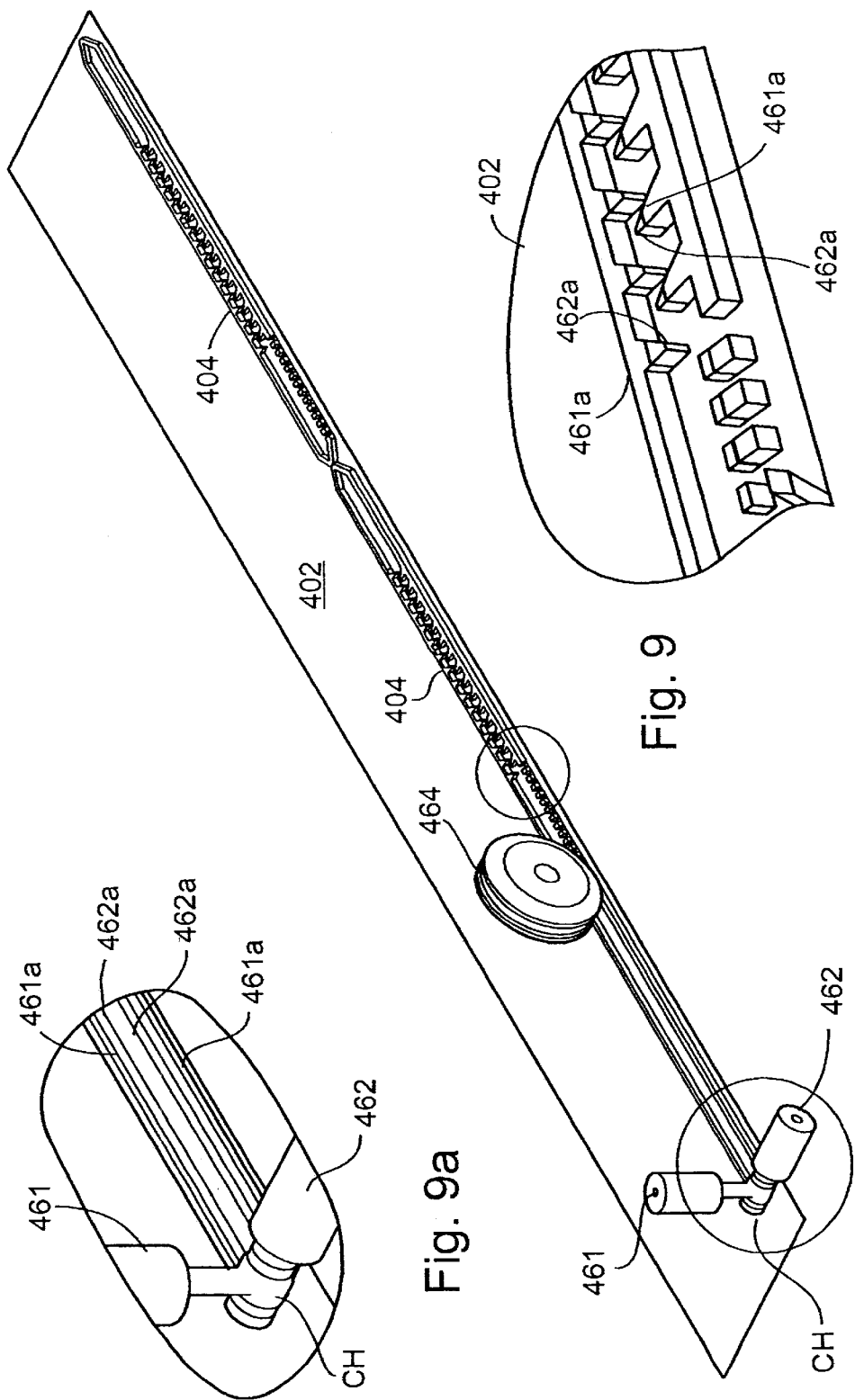

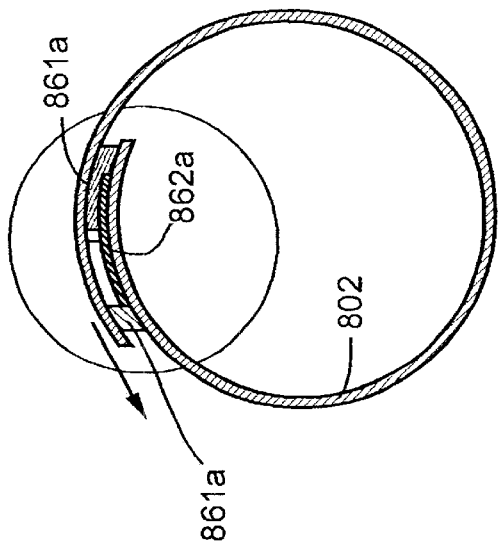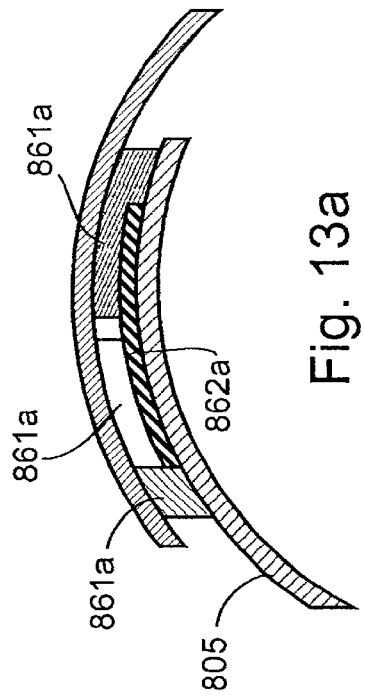
Fig. 13
Fig. 13a
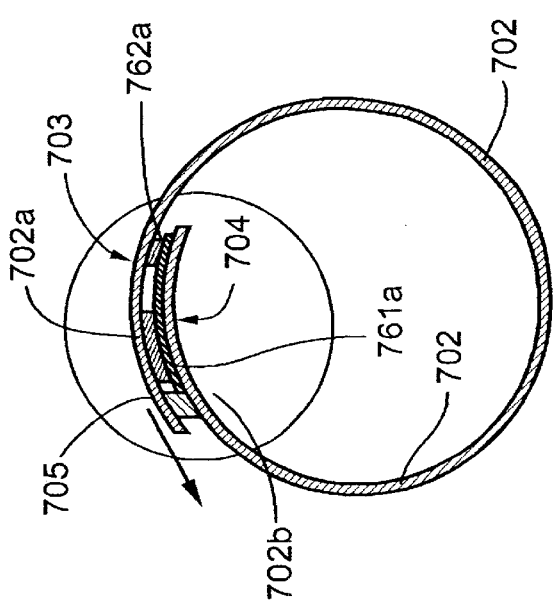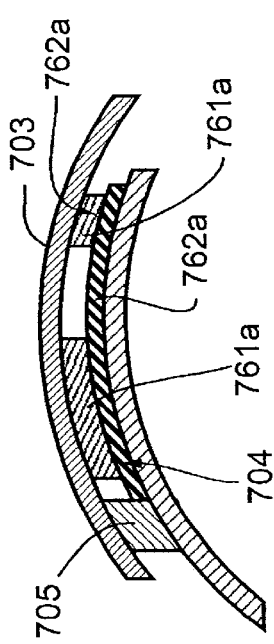
Fig. 12
Fig. 12a

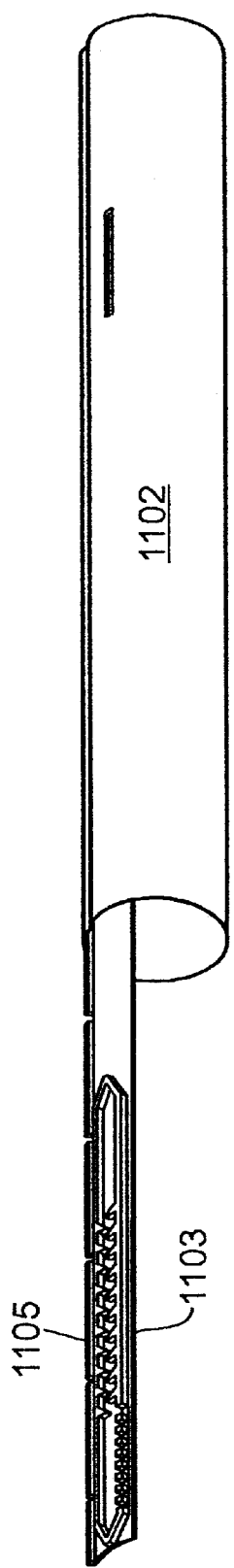
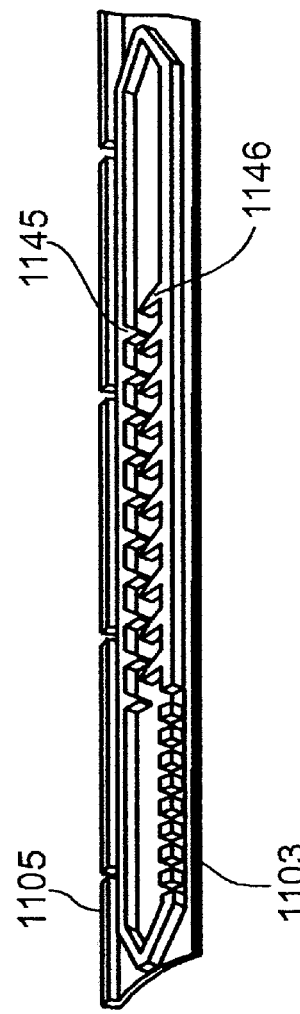
Fig. 18b
Fig. 18c

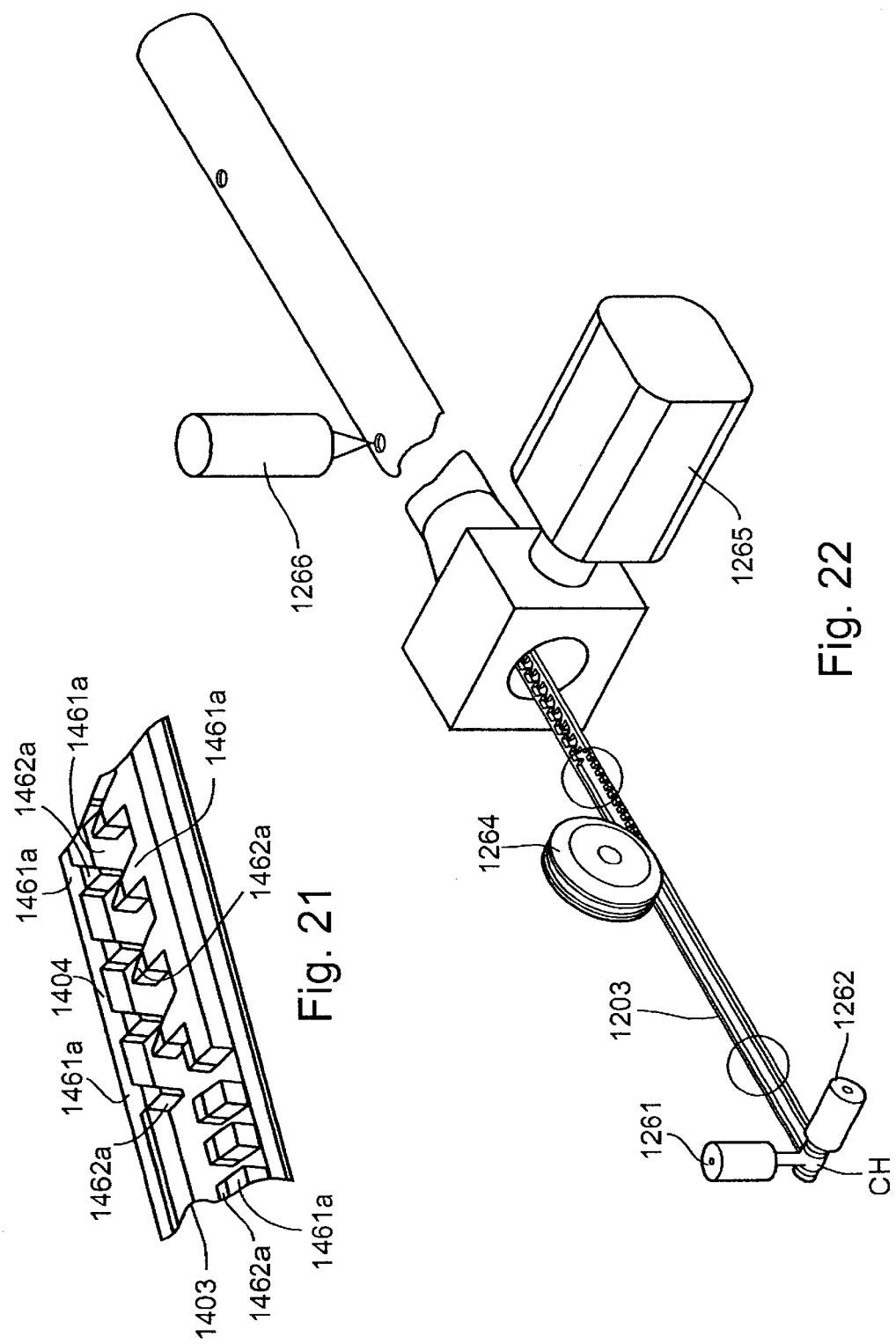

DRIP IRRIGATION HOSE AND METHOD OF MAKING SAME

FIELD AND BACKGROUND OF THE INVENTION

The present invention relates to drip irrigation hoses, and to methods of making such hoses.

Drip irrigation hoses are increasingly being used for irrigating various types of plants since they supply the water directly to the root regions of the plants, and therefore are highly conservative of water resources. One type of irrigation hose is constructed by extruding a plastic hose and simultaneously bonding to its inner surface a plurality of emitter elements, or a strip of emitters, spaced longitudinally of the hose for discharging the water at a slow rate via discharge openings formed in the hose. Another type includes a sheet of flexible plastic material formed into a seamed hose, with the emitter elements bonded within the seam or to another part of the hose for discharging the water at a slow rate through discharge openings in the hose. The present invention is applicable to both types of drip irrigation hoses.

Examples of drip irrigation hoses of both types are described in U.S. Pat. Nos. 4,196,853; 5,163,622; 5,183,208; 5,203,503; 5,246,171; 5,333,793; 5,522,551; 5,620,143; 5,695,127; and 5,785,785.

One problem in using drip irrigation hoses is the difficulty in ensuring relatively uniform discharge rates along the length of the hose. This problem is particularly acute where extremely long lengths of the hose are used since the hose itself produces a pressure drop along its length tending to decrease the discharge rate of the emitters at the end of the hose. This sensitivity of the discharge rate to the water pressure is also a problem where the land being irrigated is not flat and even.

Another problem with such drip irrigation hoses is sensitivity to clogging, and the difficulty in dislodging clogging particles.

In addition, such drip irrigation hoses are frequently used for only a single season, or for relatively few seasons. Accordingly, the cost involved in producing such drip irrigation hose is a significant factor in their use.

OBJECTS AND BRIEF SUMMARY OF THE INVENTION

An object of the present invention is to provide a drip irrigation hose in which the discharge rate from each emitter element is less sensitive to changes in the pressure of the water within the hose at the respective emitter element. Another object of the invention is provide a drip irrigation hose which has less sensitivity to clogging, and which more conveniently permits clogging particles to be dislodged. A further object of the invention is to provide a drip irrigation hose of a construction which can be produced in volume and at relatively low cost. A still further object of the invention is to provide a method of making such drip irrigation hoses.

According to one aspect of the present invention, there is provided a drip irrigation hose, comprising: a hose for conducting pressurized water through its interior and formed with a plurality of outlets for discharging the water at longitudinally-spaced locations along the length of the hose; and a plurality of emitter elements secured to the hose at longitudinally-spaced locations along its length to define a plurality of turbulent flow passageways each communicating with the interior of the hose for discharging water from a hose outlet at a slow rate; characterized in that the turbulent flow passageways are defined by a relatively elastic material coextruded with a relatively stiff material such that the relatively elastic material is pressure-deformable as compared to the relatively stiff material to change the turbulent flow passageways in response to the pressure of the water at the respective emitter element, to thereby provide pressure-compensation of the water discharge rate from the respective outlet.

According to one group of preferred embodiments of the invention described below, the hose is made by overlapping opposed longitudinal portions of thin, flexible sheet material, and welding them together with the coextruded relatively elastic material and the relatively stiff material in-between to define a seamed hose incorporating the two materials in the seam.

According to further features in some of the described embodiments, the welded overlapping portions of the seam further include a plurality of teeth defining the turbulent flow passageway, and a rib laterally of the teeth, the rib being of the relatively stiff material, and the teeth being deformable and made of the relatively elastic material.

In one such described preferred embodiment, the rib is of approximately the same height as the teeth when non-deformed, and the overlying portion of the hose is formed with a slack between the rib and the teeth to permit the pressurized water to apply a tangential force to the overlapping portions of the seam, and thereby to change the shape of the turbulent flow passageways defined by the teeth.

In another described preferred embodiment, the rib is of less height than the teeth when non-deformed thereby permitting the pressurized water to apply a tangential force to the overlapping portions of the seam and to change the shape of the turbulent flow passageways defined by the teeth.

Further embodiments are described below wherein the welded overlapping portions of the seam include a plurality of teeth made of the relatively stiff material, and a strip of the relatively elastic material underlying the teeth.

In one of the latter embodiments, the welded overlapping portions of the seam include a plurality of teeth constituted of an inner layer of the relatively elastic material, and an outer layer of the relatively stiff material. In another described embodiment, the welded overlapping portions of the seam include a plurality of teeth made of the relatively stiff material with at least the outer portions of the teeth made the relatively elastic material.

A further embodiment is described, wherein the overlapping portions, of the seam include a plurality of teeth having one side made of the relatively stiff material, and the other side made of the relatively elastic material. Preferably, in the latter embodiment, the side of the teeth made of the relatively elastic material and is of greater height than the side made of the relatively stiff material.

According to another group of embodiments described below, the hose is a continuous unseamed hose, and the plurality of emitter elements include a plurality of teeth carried by a base strip welded to the inner surface of the hose and defining the turbulent flow passageways.

According to further features in some of these described embodiments, the base strip also includes a rib of a relatively stiff material welded between the base strip and the inner surface of the hose. In one described embodiment, the rib is of approximately the same height as the teeth, and the hose is formed with a slack between the rib and the teeth to permit the pressurized water to apply a tangential force to the teeth and thereby to change the shape of the turbulent flow passageways. In another described embodiment, the rib is of less height than the teeth such as to permit the pressurized water to apply a tangential force to the teeth and thereby to change the shape of the turbulent flow passageways.

According to another aspect of the invention, there is provided a drip irrigation hose, comprising: a hose for conducting pressurizing water therethrough and formed with a plurality of longitudinally spaced outlets for discharging water therefrom; and a plurality of emitter elements at least partly made of relatively elastic material welded at longitudinally-spaced locations along the inner surface of the hose and defining a plurality of restricted flow passageways to the plurality of hose outlets for discharging water from each outlet at a slow discharge rate; the hose carrying a longitudinally-extending rib of relatively stiff material welded between the emitter elements and the inner surface of the hose such that when the water within the hose is pressurized, the pressurized water initially tautens the hose and changes the shape of the restricted flow passageways, to thereafter decrease the sensitivity of the water discharge rate from each outlet to changes in pressure of the water within the hose.

According to a further aspect of the invention, there is provided a method of making a drip irrigation hose, comprising: coextruding a strip of a relatively stiff material and a strip of a relatively elastic material on a substrate; forming at least one of the strips into a plurality of emitter elements at longitudinally-space locations along the length of the substrate; and utilizing the substrate including bonding the coextruded strips thereon to produce a hose having the plurality of emitter elements welded thereto to define a plurality of turbulent flow passageways to discharge openings in the hose for discharging water from the hose at a slow rate.

In some described embodiments, the substrate on which the strips are coextruded is one edge of a flexible sheet which edge is overlapped with and bonded to an opposite edge of the flexible sheet to produce a seamed hose with the emitter elements welded within the seam. In other described embodiments, the substrate on which the strips are coextruded is welded to the inner face of a seamless hose.

As will be described more particularly below, a drip irrigation hose constructed in accordance with the foregoing features provides pressure compensation in the discharge rate from each emitter element, thereby making the discharge from each emitter element less sensitive to changes in the pressure of the water within the hose at the respective emitter element. In addition, such drip irrigation hoses have a relatively low sensitivity to clogging. In addition, and as will be described more particularly below, certain embodiments of the invention produce not only compressional forces, in the emitter elements, but also tangential forces which tend to dislodge clogging particles. Further, and as will also be more particularly described below, such drip irrigation hoses may be made in volume and at relatively low cost.

According to a further feature of the invention, the relatively elastic material can be extruded intermittently for each emitter, rather than continuously for the complete strip, thereby significantly reducing the cost of making the drip irrigation hose.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a perspective view, partly broken away, illustrating one form of drip irrigation hose constructed in accordance with the present invention, FIG. 1a being an enlarged fragmentary view of a part of FIG. 1;

FIG. 2 is a transverse sectional view of the drip irrigation hose of FIG. 1, FIG. 2a being an enlarged fragmentary view of FIG. 2 illustrating the initial condition of the hose and FIG. 2b corresponding to that of FIG. 2a but illustrating the condition of the hose after it is pressurized with irrigation water;

FIG. 3 is a curve illustrating how the water discharge rate from an outlet opening varies with the water pressure in the drip irrigation hose of FIGS. 1 and 2;

FIG. 4 is a transverse sectional view, corresponding to that of FIG. 2 but illustrating a modification in the construction of the drip irrigation hose, FIG. 4a being an enlarged fragmentary view of a part of FIG. 4 in the initial condition of the hose;

FIG. 6 illustrates another method of making the drip irrigation hose, FIG. 6a being enlarged fragmentary view of a part of FIG. 6 after embossment;

FIG. 7 illustrates a part of the drip irrigation hose made according to the method of FIGS. 6 and 6a;

FIG. 8 illustrates another method of making the drip irrigation hose, FIG. 8a illustrating the coextruders, and FIG. 8b illustrating a part of the hose so made;

FIG. 9 illustrates a further method of making the drip irrigation hose, FIG. 9a illustrating the coextruders, and FIG. 9b illustrating a part of the hose so made;

FIG. 12 is a transverse sectional view illustrating a further modification in the construction of the drip irrigation hose, FIG. 12a being an enlarged fragmentary view of FIG. 12;

FIG. 13 is a transverse sectional view illustrating a still further modification, FIG. 13a being enlarged fragmentary view of a part of FIG. 13;

FIG. 15 is a perspective view illustrating a seamless drip irrigation hose constructed in accordance with the present invention, FIG. 15a illustrating the strip of emitter elements in the hose of FIG. 15, and FIG. 15b being an enlarged illustration of one of the emitter elements in the strip of FIG. 15a;

FIG. 16 is a transverse sectional view of the hose of FIG. 15, FIG. 16a being an enlarged view of a part of FIG. 16 and FIG. 16b being a fragmentary view of a part of the emitter element of FIG. 16a;

FIG. 18b is a perspective view illustrating the irrigation hose of FIG. 18, and FIG. 18c illustrates one of the emitter elements in the hose of FIG. 18;

FIG. 21 is a fragmentary view illustrating a still further construction;

DESCRIPTION OF A PREFERRED EMBODIMENT

Figure 5:
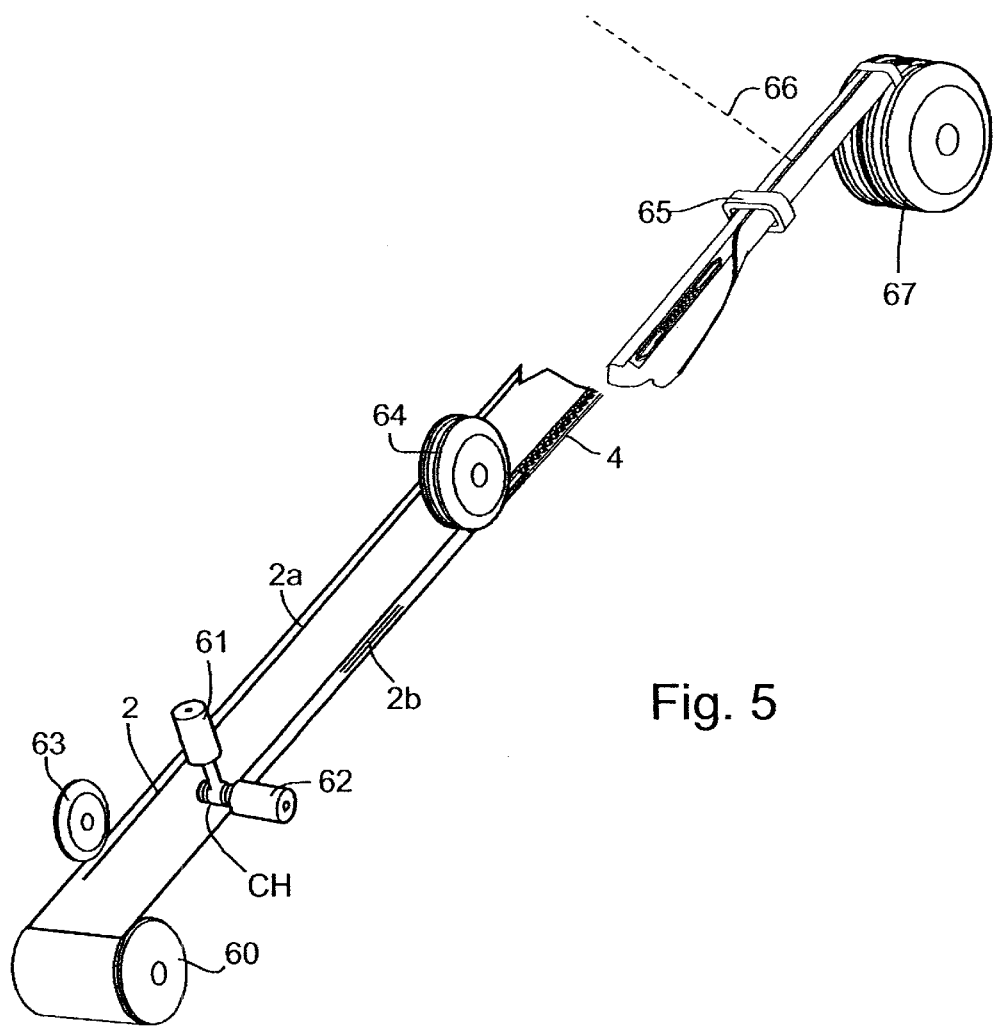
FIG. 5 illustrates one manner of making the drip irrigation hose of FIG. 1, FIG. 5a being an enlarged fragmentary view of a part of FIG. 5 before embossment, and FIG. 5b being a corresponding view after embossment.

With reference to FIGS. 1 and 2, there is illustrated a drip irrigation hose comprising a sheet of 2 of thin, flexible plastic material having opposed outer edge portions 2a, 2b which are overlapped and bonded together to form a seam 3 extending longitudinally of the so-produced hose for conducting pressurized water therethrough. A plurality of emitter elements, each generally designated 4, are bonded between the overlapping portions 2a, 2b of the sheet 2 at longitudinally-spaced locations along the seam 3, and define a plurality of restricted flow passageways for discharging water from outlets in the seamed hose at a slow rate.

The overlapping portions 2a, 2b of the flexible sheet are bonded together both by the emitter elements 4, and by a continuous, longitudinally-extending rib 5 extending along the outer edge of the outer overlapping portion 2a. As shown particularly in FIGS. 2 and 2a, the outer overlapping portion 2a is formed with an inwardly-extending slack 6 between the rib 5 and the emitter elements 4. The purpose of slack 6, as will be described more particularly below, is to cause the seamed hose, when pressurized by the water flowing through it, to tauten the hose wall, and thereby to apply a tangential force to the emitter elements 4 within the seam 3, such that thereafter the emitter elements will control the discharge rate through the hose outlets according to the pressure of the water within the hose. Such an arrangement, as described below, decreases the sensitivity of the water discharge rates to changes in pressure of the water within the hose. The tangential force produces relative movement between the overlapping ends of the hose, thereby also tending to dislodge clogging particles within the emitter elements.

The structure of each of the emitter elements 4 is best seen in FIGS. 1 and 1a. Each emitter element includes a pair of spaced longitudinally-extending plastic strips 41, 42 closed at its opposite ends by converging transversely-extending strips 43, 44. Each emitter element further includes a plurality of teeth 45, 46 alternatingly projecting from one longitudinal strip towards the other longitudinal strip to define a labyrinth producing a turbulent flow passageway for the water through the emitter element. The water is inletted into the emitter element via inlet openings 47 in longitudinal strip 42 at the inlet end of the labyrinth defined by the teeth 45, 46, and is outletted from the emitter element via an outlet opening 48 in the plastic hose 2 at the outlet end of the labyrinth.

The continuous rib 5 at the outer edge of the seam 3 is made of a relatively stiff material. Elements 41–47 of the emitter elements 4, however, are made of a relatively elastic material which is softer and more pressure-deformable than the rib 5. Initially the emitter elements 4 in the embodiment of FIGS. 1 and 2, are of substantially the same height as the rib 5. A preferred relatively stiff material for the continuous rib 5 is polyethylene, and a preferred relatively elastic material for elements 41–47 of the emitter elements 4 is a thermoplastic elastomer. These materials are also preferred in the constructions described below for the relatively stiff material and the relatively elastic material, respectively.

FIG. 3 illustrates how the discharge rate from the discharge openings 48 varies with the water supply pressure in the drip irrigation hose of FIG. 1.

Thus, when the hose is first filled with water, the water causes the hose to assume the circular shape illustrated in FIG. 2. In this initial condition of the hose, the slack 6 between the outer rib 5 and the emitter elements 4 is present, as shown particularly in FIG. 2a; in this initial condition, there is no significant tangential or shear force applied to the emitter elements 4, and the height of the emitter elements 4 remains substantially the same as the height of the rib 5.

As the water within the hose 2 is pressurized, the pressure tends to increase the diameter of the hose 2. Since the rib 5 is firmly bonded between the overlapping sheet portions 2a, 2b of the seam 3 at the outer edge of the overlying portion 2a, and since the rib 5 is relatively stiff whereas the emitter elements 4 are relatively elastic and pressure-deformable, the increase in pressure within the hose 2 will tauten the slack 6, and at the same time will tend to move hose edges 2a, 2b in opposite directions, thereby applying a tangential or shear force to the emitter elements. Since these elements are of a relatively elastic or deformable material, this tangential force will change the shape of the turbulent flow passageways defined by them to change the resistance to flow. The movement of hose edges 2a, 2b in opposite directions will also tend to dislodge clogging particles.

In addition, an increase in the pressure within the hose will tend to compress the relatively elastic elements, to thereby reduce the cross-sectional area of the flow path.

It will thus be seen that the pressure-compensation is effected by two forces, namely: the tangential force tending to change the shape of the turbulent flow path; and the compressional force tending to reduce the cross-sectional area of the flow path. The above two forces actually act in parallel, but the tangential force is predominant in the lower pressure ranges until the slack 6 is taken-up, whereupon the compressional force becomes predominant in the higher pressure ranges.

The foregoing is illustrated in FIG. 3, wherein the broken line O-Z illustrates the flow without pressure-compensation, line O-X illustrates the pressure-compensation in the lower pressure ranges primarily by the above-described tangential force, and line X-Y illustrates the pressure compensation in the higher pressure ranges primarily by the above-described compressional forces.

FIG. 4 illustrates a variation in the construction of the seamed hose, therein generally designated 102. In this variation, the seam 103 is also produced by the overlapping edge portions 102a, 102b bonded together by the emitter elements 104 and by the longitudinally-extending rib 105, but here the rib 105 is of less height than the emitter elements 104 in the non-pressurized condition of the hose 102, as shown in FIGS. 4 and 4a. However, as soon as the hose 102 is pressurized, the hose tends to tauten and to move the overlapping hose ends 102a, 102b in opposite directions, to apply tangential or shear forces to the emitter elements 104 and thereby to change the turbulent flow passageways defined by the emitter elements. Accordingly, after the initial pressurization of the hose, the emitter elements will become more or less stressed in shear, according to the pressure changes of the water within the hose, to change the effective cross-section of the flow paths, and thereby to change the sensitivity of the water discharge rates from the emitter elements, in response to changes in pressure of the water within the hose, as described above with respect to FIGS. 1–3.

Figure 5A:
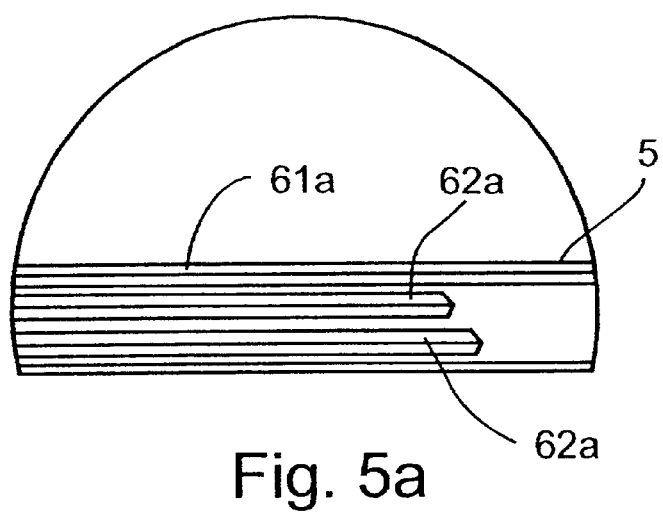
Figure 5B:
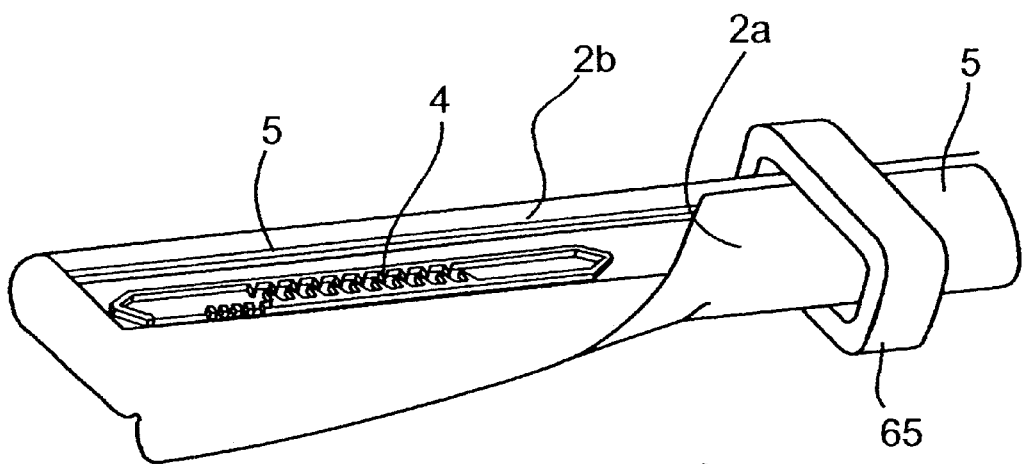

FIGS. 5, 5a and 5b illustrate one manner of producing the drip irrigation hose of FIGS. 1 and 2, which method can also be used for producing the hose of FIG. 4.

Thus, as shown in FIG. 5, the initial sheet 2 of thin flexible plastic material is fed from a supply roll 60 past two extruders 61, 62 within a common cross-head CH as used in coextrusion of two different materials. Extruder 61 extrudes a continuous strip 61a of the relatively stiff material which defines the continuous rib 5; whereas extruder 62 intermittently extrudes two strips 62a of the pressure-deformable material to be shaped by an embosser wheel 64 to define the longitudinally-spaced emitter elements 4. Strip 61a defining the rib 5 and the strips 62a to define the emitter elements 4 are both extruded adjacent to the outer edge portion 2b of the sheet 2 with the emitter element strips at the outer edge.

The opposite edge portion 2a of the sheet 2 is engaged by a rotary wheel 63 which produces the slack 6 between the rib 5 and the emitter elements 4 as shown in FIG. 2a for example. Extruder 61 operates continuously, while extruder 62 operates intermittently in synchronism with the embosser wheel 64.

Downstream of the embosser wheel 64 is a folding member 65 which folds the opposite end portions 2a, 2b of the sheet 2 and welds them together with the rib 61a and the emitter elements 4 in-between to produce the drip irrigation hose, as described above with respect to FIGS. 2 and 2a. Both the plastic emitter elements 4 and the continuous plastic rib 5 are thus utilized for securely welding the opposite edges of the sheet together to produce the seam 3.

The so-produced irrigation hose is then fed past a perforator, schematically shown at 66, for producing the discharge openings 48 (FIG. 1) aligned with the outlet end of each of the emitters 4, before being wound on a take-up reel 67.

FIGS. 6, 6a and 7 illustrate a modification in the construction of the drip irrigation hose, and also in the apparatus for producing it. Here, the flexible plastic sheet 202 is also fed past a pair of extruder 261, 262, in coextruder head CH, but in this case one extruder 262 extrudes a continuous strip 262a (FIG. 7) of the relatively elastic material, e.g., a thermoplastic elastomer; whereas the other extruder 261 extrudes two continuous strips 261a of the relatively stiff material, e.g., polyethylene, on opposite side of strip 262a, as shown in FIG. 7. The embosser wheel 264 downstream of the two extruders 261, 262 is located to emboss mainly the outer polyethylene strips 261a to form the emitter elements 204 of the same structure as described above with respect to FIGS. 1 and 1a, except that in this case the emitter elements 204 are made of the stiffer polyethylene and overlie a continuous strip 262a of the relatively elastic thermoplastic, as shown particularly in FIG. 7. The remainder of the process for producing the drip irrigation hose illustrated in FIGS. 6, 6a and 7, is otherwise the same as described above with respect to FIGS. 5 and 5a.

It will be appreciated that the drip irrigation hoses produced according to FIGS. 6, 6a and 7 do not have the continuous rib 5 of stiff plastic material or the slack 6. Rather, the emitter elements 4 will be produced from the relatively stiff plastic material (polyethylene) strips 261a which are embossed to define the emitter elements 41–47 as described above with respect to FIG. 1 with the teeth 45, 46 of the emitter elements overlying the pressure-deformable strip 262a of thermoplastic elastomeric material. An increase in the water pressure within the hose will press the thermoplastic elastomeric material 262a into the spaces between the teeth of the stiff plastic material 261a, whereas a decrease in the water pressure will withdraw the elastomeric material from the space between the teeth. Accordingly, layer 262a of the elastomeric material will act to change the effective cross-sectional areas of the flow passageways defined by these emitter elements, and thereby to decrease the sensitivity of the water discharge rates, in response to changes in the pressure of the water within the hose.

FIG. 8 illustrates another construction of the drip irrigation hose which may also be produced by the apparatus described above with respect to FIGS. 6, 6a, except in this case, the two extruders 361 and 362 are arranged such that two strips of the relatively stiff material 361a are applied over the thermoplastic elastomeric layer 362a (FIG. 8a) as in FIGS. 6 and 7, except in this case the embosser wheel 364 embosses both layers to define the emitter elements 304 (FIG. 8b). Thus, as shown in FIG. 8b the emitter elements 304 so produced would be of the same construction as described above with respect to FIG. 1, except that each of the elements (e.g., 41–47) of each emitter element 304 would be constituted of two layers, namely an outer layer 361a of the stiffer plastic material (e.g., polyethylene), and an inner layer 362a of the pressure-deformable thermoplastic elastomeric material. Changes in water pressure within the hose thus causes the elastomeric material 362a to be compressed to change the height of the teeth and thereby to produce the changes in the effective cross-sectional area of the emitter flow path in response to changes of pressure within the irrigation hose at the respective emitter outlet.

FIGS. 9, 9a and 9b illustrate another construction wherein the emitter elements, therein designated 404, are also applied by coextrusion of two plastic materials onto the plastic sheet 402. In this case, the emitters are produced by coextruding two parallel strips, each including an upper layer of the relatively stiff plastic material 461a, such as polyethylene, applied by extruder 461, and a lower layer of the relatively elastic plastic material 462a, such as a thermoplastic elastomer, applied by extruder 462. The embosser 464 is applied to the two strips such that at least the outer portions of the teeth in each emitter element are constituted of the relatively elastic thermoplastic elastomer, as shown at 462a in FIG. 9b. Such a construction minimizes the amount of the more expensive elastomeric material used. In all other respects, the construction of the drip irrigation hose illustrated in FIGS. 9, 9a and 9b, and the manner of manufacturing it, are similar to the structures and methods described above.

Figure 10:
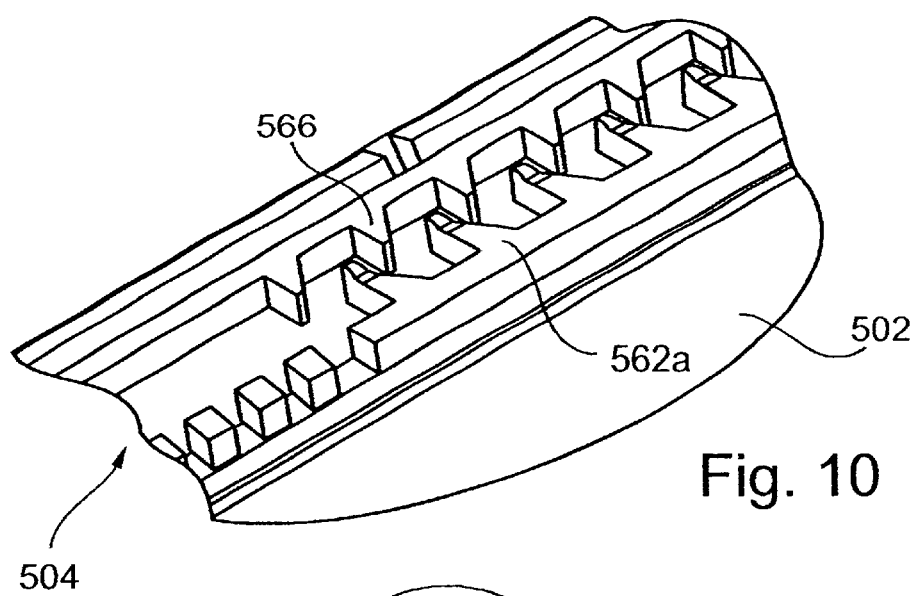
FIG. 10 illustrates yet another modification in the construction of the drip irrigation hose.
Figure 11:
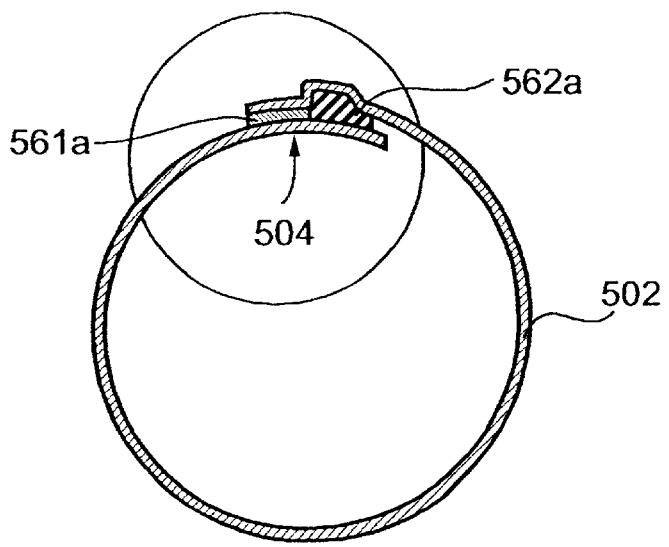
FIG. 11 is a transverse sectional view of a drip irrigation hose constructed according to FIG. 10, FIG. 11a being an enlarged fragmentary view of FIG. 11.
Figure 11A:
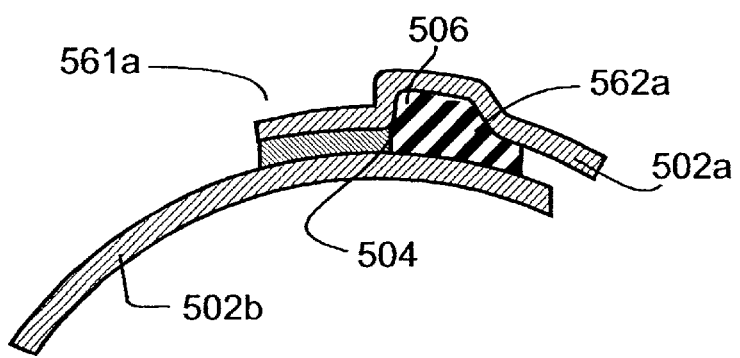

FIGS. 10, 11 and 11a illustrates another construction of the drip irrigation hose 502. In this construction, each of the emitter elements 504 deposited on the plastic sheet used for producing the hose 502 includes a strip of the relatively stiff plastic material 561a on one side, and a strip of the relatively elastic material 562a on the opposite side which strips are formed by the embossing wheel (not shown) to produce the respective emitter element. Thus, as shown in FIGS. 10, 11 and 11a, one longitudinally-extending strip together with its teeth are formed of the stiff plastic material 561a (e.g., polyethylene), whereas the other longitudinally-extending strip and its projecting teeth are formed of the elastic and pressure-deformable thermoplastic elastomeric material 562a, to provide the pressure compensation in response to changes in pressure of the water conducted by the drip irrigation hose.

As shown particularly in FIG. 11, the teeth formed by the relatively elastic material 562a are of a greater height than the teeth formed of the relatively stiff material 561a. This produces a slack, shown at 506, in the hose 502, comparable to slack 6 in FIG. 2, such that when pressurized water is applied to the hose, the two edge portions 502a, 502b of the hose 502 tend to move apart, thereby applying a shear or tangential force to the emitter elements, particularly to teeth 562a of the relatively elastic material. This has the effect of changing the turbulent flow passageway defined by the opposing teeth, as well dislodging particles which may tend to have become clogged in that passageway, as described above particularly with respect to the embodiment of FIGS. 2 and 4.

FIGS. 12 and 12a illustrate a further variation, wherein the seam 703 of the hose 702 is bonded by both the emitter elements 704 and the continuous rib 705, similar to the arrangement of FIG. 2. In this case, however, the hose is not formed with a slack (corresponding to slack 6 in FIG. 2), but rather receives a strip of the relatively elastic material 762a to underlie the two strips of relatively stiff material 761a applied thereover. The latter two strips are embossed, e.g., similarly as shown in FIG. 6a, so that the elastic material 762a would be pressure-compressible deforming it into the space between the teeth of strip 761a to change the effective cross-sectional area of the turbulent pathway in response to changes in the water pressure, as described above with respect to FIG. 7.

FIGS. 13 and 13a illustrate a modification similar to that of FIGS. 12 and 12a, except that the continuous rib 705 is omitted. Instead, the two strips of the stiff plastic material 861a are applied to enclose the pressure-deformable elastic layer 862a on three sides of the seam 803, similar to the arrangement described above with respect to FIGS. 6, 6a and 7.

Figure 14:
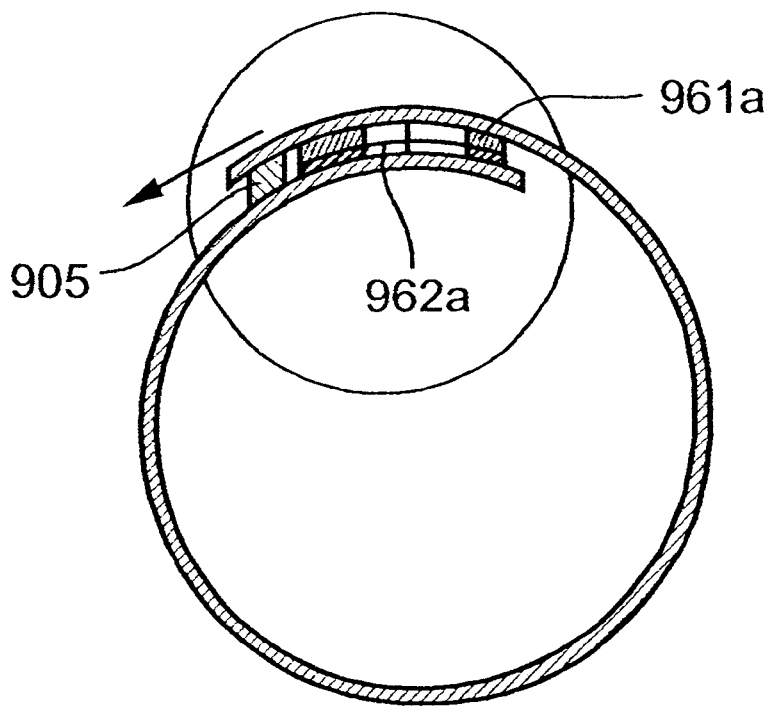
FIGS. 14 and 14a are views corresponding to those of FIGS. 13 and 13a but illustrating a further modification.
Figure 14A:
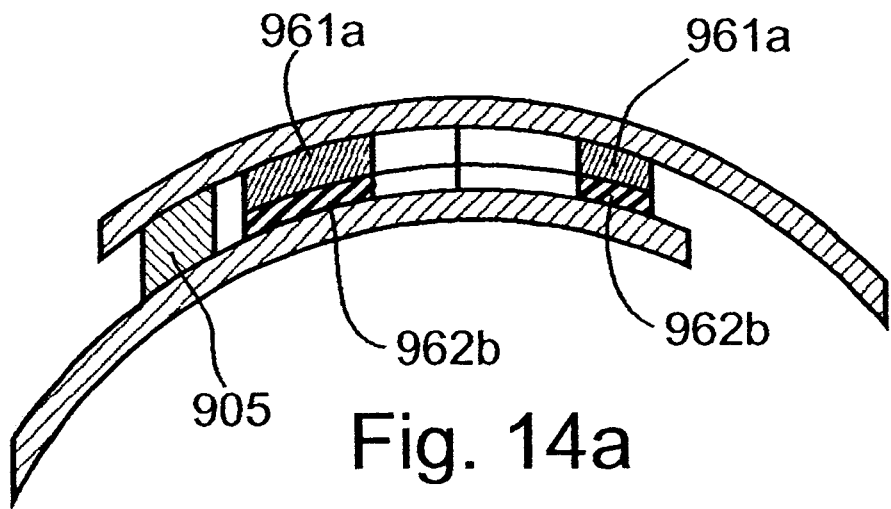

FIGS. 14 and 14a illustrate a further construction, similar to that of FIGS. 12 and 12a, except that in the construction of FIGS. 14 and 14a, the two overlying stiff plastic strips 961a are applied so as to be coextensive with the underlying thermoplastic elastic strips 962a, and the stiff plastic rib 905 is initially spaced from all the strips 961a and 962a. Also, all the strips 961a, 962a are embossed to form the teeth of the turbulent flow path, as described above with respect to FIGS. 8, 8a and 8b.

While all the above constructions are described as embodied in a seamed-type drip irrigation hose, it will be appreciated that some or all of such constructions could also be embodied in a non-seamed drip irrigation hose, such as produced by extrusion. FIGS. 15–23 illustrate examples of such constructions.

Figure 15:
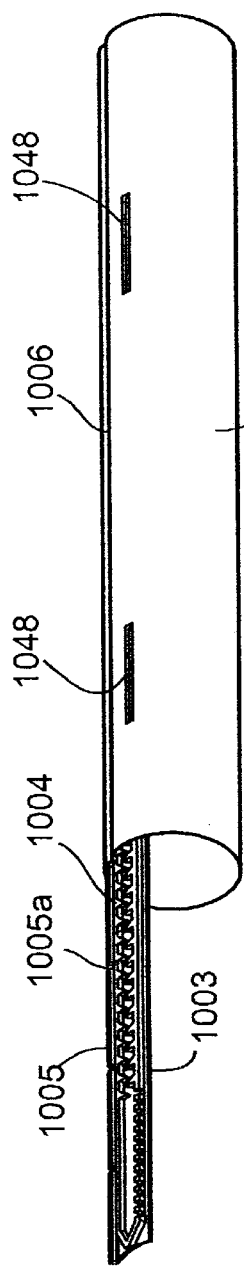
Figure 15A:
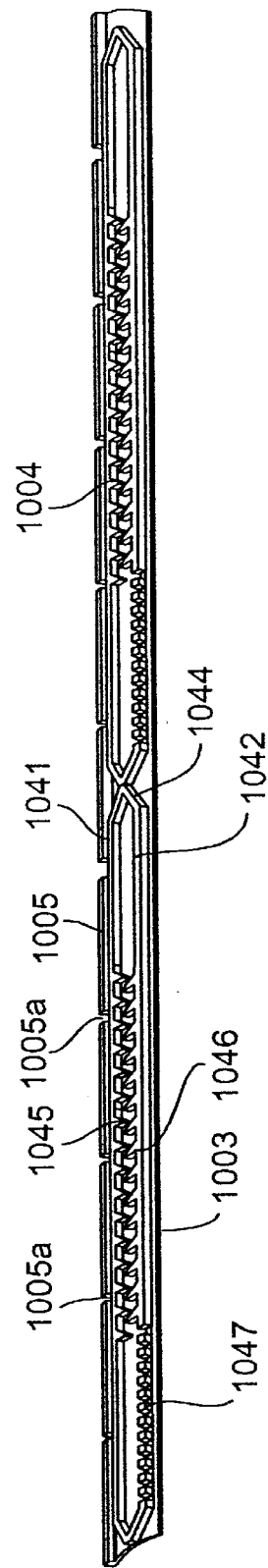
Figure 15B:
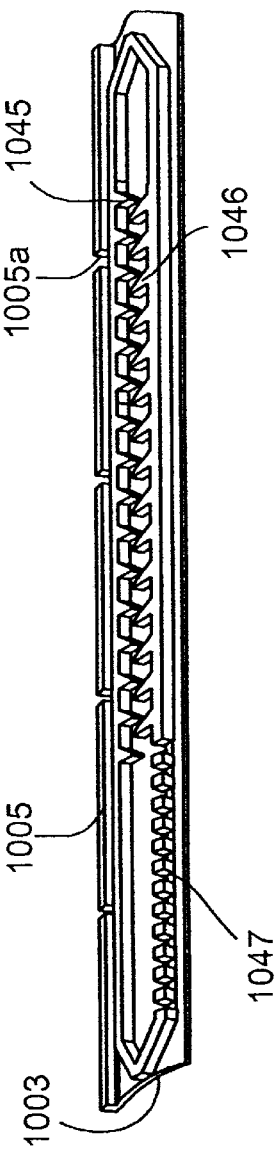
Figure 16:
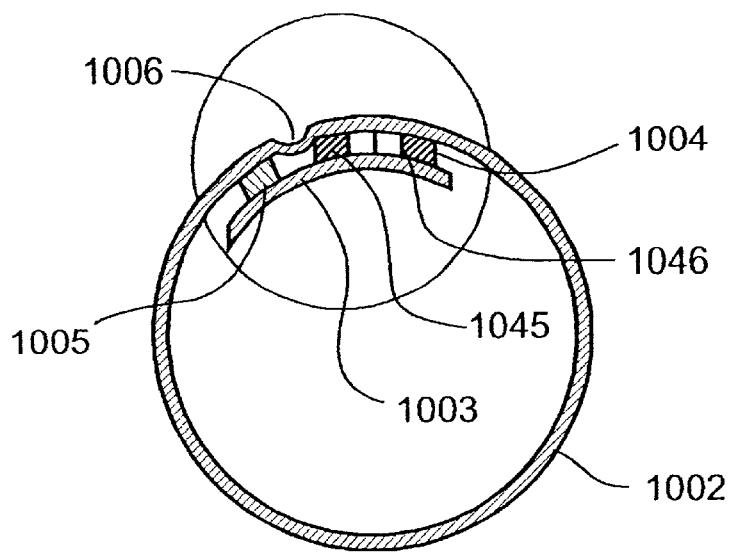
Figure 16A:
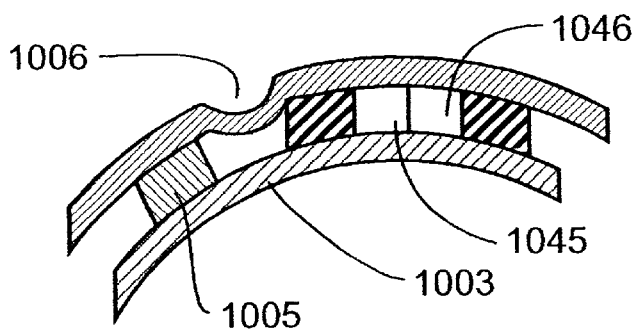

Thus, as shown in FIGS. 15 and 16, a continuous unseamed hose 1002 is produced by extrusion, and concurrently with the extrusion, a strip 1003 of emitter elements 1004, concurrently or previously produced by coextrusion and embossed, is bonded to the inner face of the extruded hose. As particularly shown in FIGS. 15a and 15b, strip 1003 is formed with a continuous rib 1005 of the relatively stiff material (corresponding to rib 5 in FIG. 2), and with a plurality of emitter elements 1004 each constituted of a pair of longitudinally-extending strips 1041, 1042, of the relatively elastic material. The latter strips are closed at the opposite ends by transversely-extending strips 1043, 1044 having the alternatingly projecting teeth 1045, 1046 to define the labyrinth-type turbulent flow path. One strip 1042 is formed with the inlet openings 1047 at one end of the labyrinth. The opposite end of the labyrinth communicates with an outlet 1048 in the extruded tube 1002. Preferably, the continuous rib 1005 is formed with a plurality of transverse slots 1005a to equalize the pressure on both sides of the rib since, in this case, the bottom of the rib is covered by the continuous strip 1003.

In order to provide pressure compensation for the turbulent flow paths in response to changes in the water pressure, a slack 1006 is produced in the extruded hose 1002 between the continuous rib 1005 and the emitter elements 1004, as described above with respect to the construction of FIGS. 1 and 2. For the same reasons, the rib 1005 is preferably made of a relatively stiff plastic material, such as polyethylene, whereas the emitter elements 1004 are made of the relatively elastic material, such as a thermoplastic elastomer, to provide pressure compensation in the labyrinth flow paths in response to changes in the water pressure.

Figure 16B:
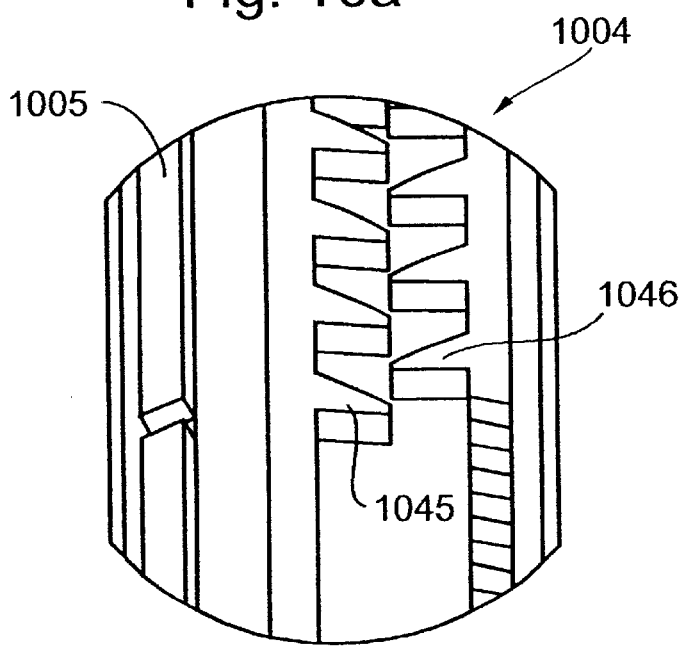

FIGS. 16–16b illustrate the normal non-pressurized condition of the emitter elements 1004, i.e., before the slack 1006 has been taken up by the initial pressure. As shown in FIG. 16b, in this condition the teeth 1045, 1046, made of the elastomeric material, terminate substantially along the center line of the labyrinth flow path defined by those teeth.

Figure 17:
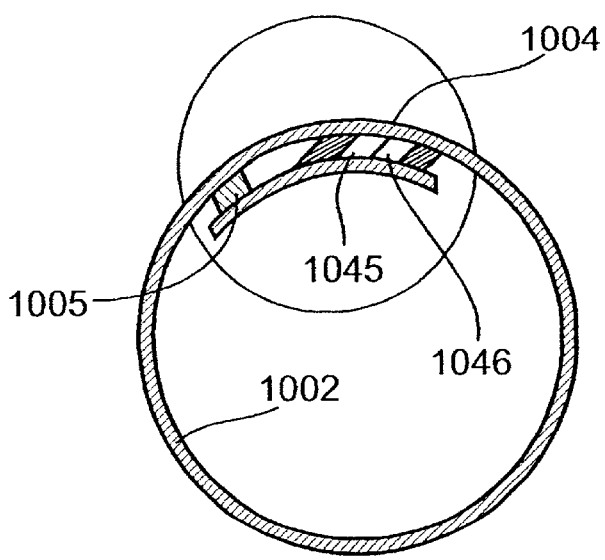
FIGS. 17, 17a and 17b are corresponding views illustrating the emitter of FIGS. 17, 17a and 17b under pressure.
Figure 17A:
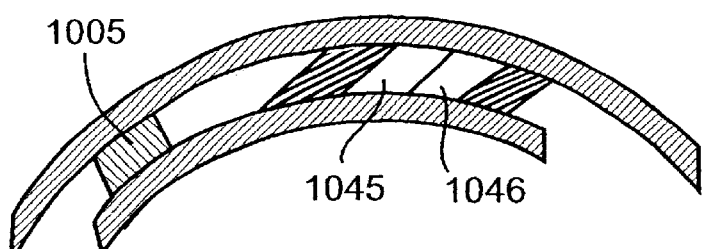
Figure 17B:
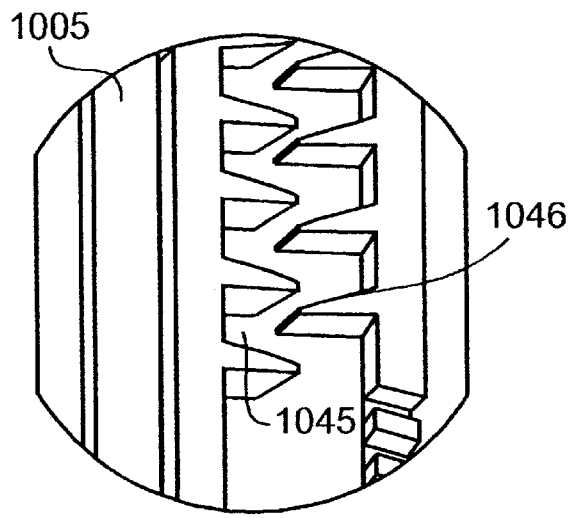

FIGS. 17, 17a and 17b illustrate the condition of the emitter elements after the hose has been pressurized so as to remove the slack 1006, and thereby to enable the emitter elements 1004 to control the turbulent flow path in order to compensate for changes in pressure of the water in the hose. Thus, an increase in the water pressure will produce a tangential face tending to deform the teeth 1045, 1046, such that the teeth will project past the center line, changing the shape of the cross-sectional area of the flow path and increasing the resistance to flow. A decrease in the water pressure will produce the opposite effect. The foregoing effects are substantially the same as occurring with respect to the constructions of FIGS. 1, 2, and 4, and, as described above, enable the emitter elements 1004 to control the labyrinth flow path in order to compensate for changes in the water pressure.

Figure 18:
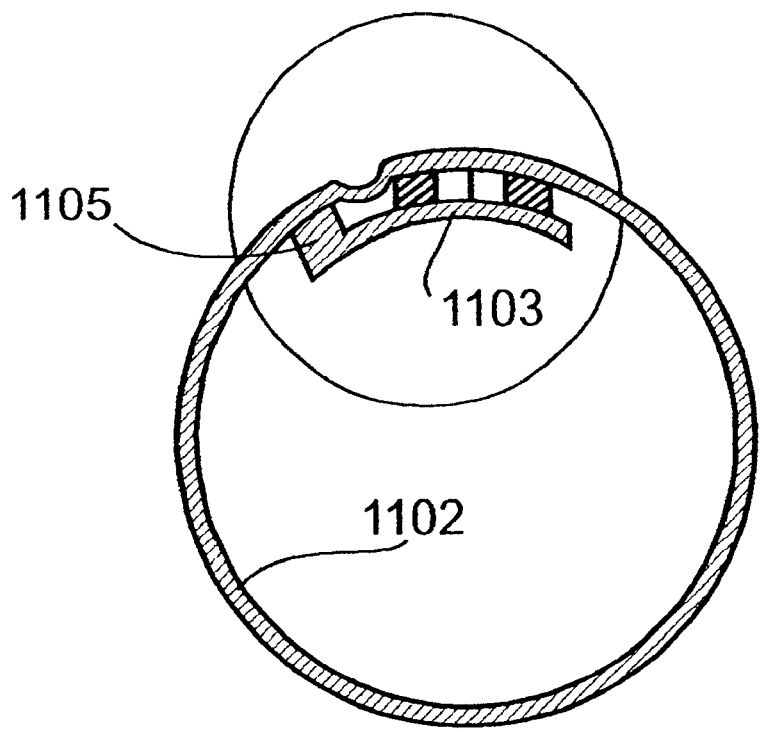
FIG. 18 illustrates a still further construction.
Figure 18A:
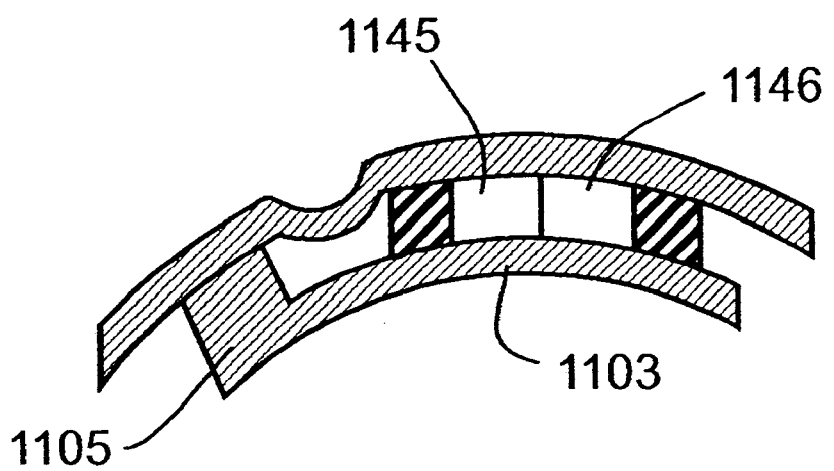
FIG. 18a is an enlarged sectional view of FIG. 18.

FIGS. 18 and 18a–18c illustrate a modification in such a construction, wherein the continuous rib 1105 is integrally formed with the emitter strip 1103. In all other respects, the drip irrigation hose 1102 of FIGS. 18 and 18a is constructed with the teeth 1145, 1146 of the relatively elastic material to operate as described above.

Figure 19:
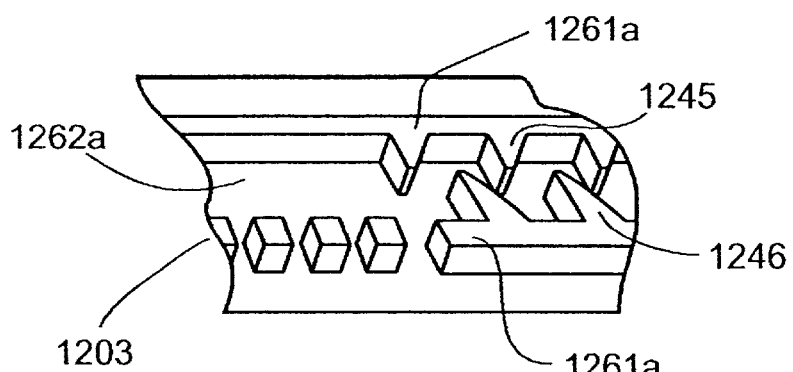
FIG. 19 is a fragmentary view illustrating a still further construction, FIG. 19a being a sectional view thereof.
Figure 19A:
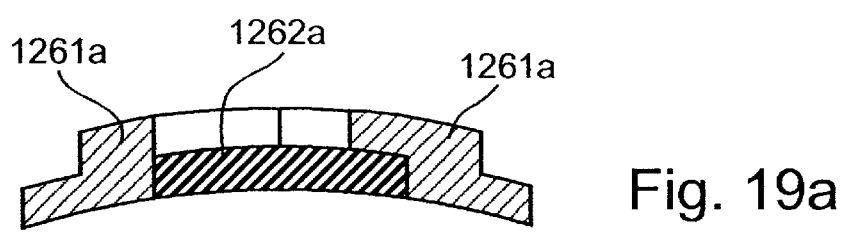

FIGS. 19 and 19a illustrate an emitter strip 1203 for application to an extruded hose (not shown), which emitter strip is similar to the construction described above with respect to FIGS. 6 and 7 for a seamed hose. Thus, in the construction illustrated in FIGS. 19 and 19a, the emitter strip 1203 includes an underlying layer 1262a of the elastomeric material, and two lateral strips 1261a of the stiff plastic material formed with the teeth 1245, 1246 defining the turbulent labyrinth flow path. Such an emitter strip may be produced by coextrusion of the two materials followed by embossing the teeth, either before the extrusion of the hose, or concurrently with the extrusion of the hose.

Figure 20:
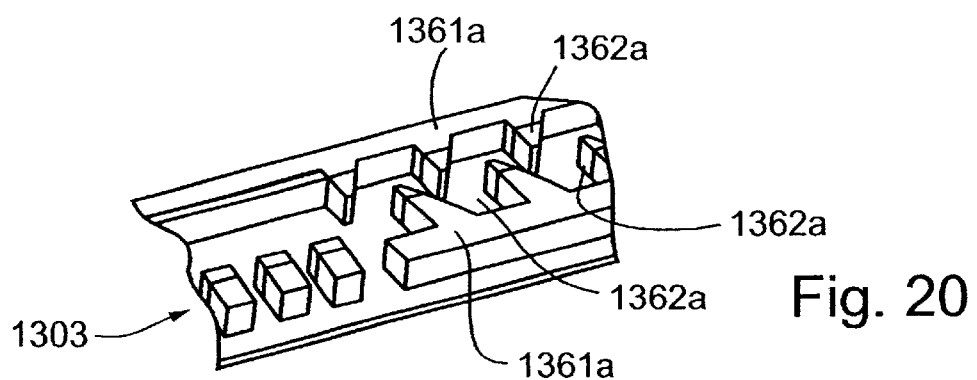
FIG. 20 is a fragmentary view illustrating a still further construction, FIG. 20a being a sectional view thereof.
Figure 20A:
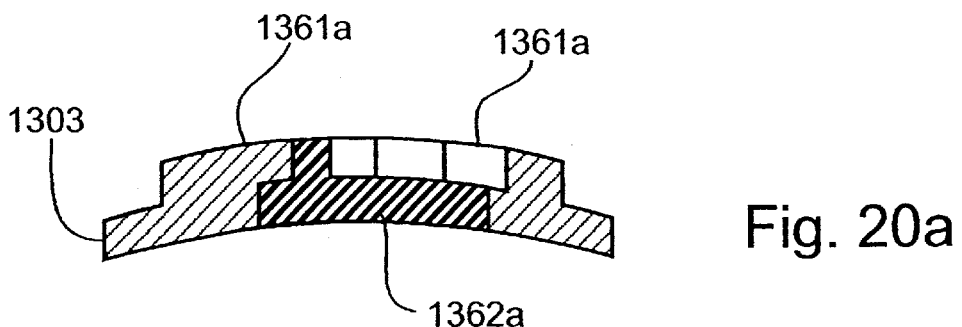

FIGS. 20 and 20a illustrate an emitter strip, therein designated 1303, constructed as in FIGS. 19 and 19a, except that in this case, the tips of the teeth, as well as the bottom strip, are constituted of the thermoplastic elastomeric material, shown at 1362a, whereas the longitudinally-extending strips and the bases of the teeth are made of the stiff plastic material, as shown at 1361a.

FIG. 21 illustrates a construction, similar to that illustrated in FIG. 9, except that only the tips of the teeth are made of the thermoplastic elastomeric material, as shown at 1462a, whereas the remainder of each emitter element 1404 in the emitter strip 1403 is made of the stiff plastic material, as shown at 1461a.

Figure 22A:
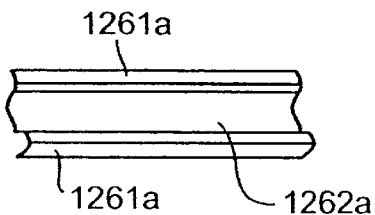
FIG. 22 illustrates a further modification in the method of making the drip irrigation hose, FIG. 22a illustrating the coextruded strips before embossment, FIG. 22b illustrating them after embossment, and FIG. 22c being a section of the emitter strip after embossment.
Figure 22B:
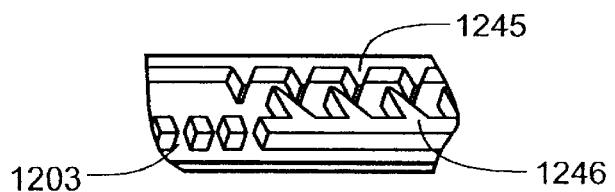
Figure 22C:
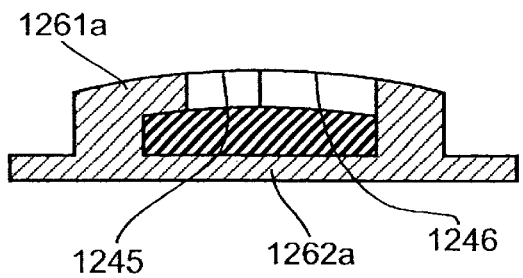

FIG. 22 illustrates a method of producing a drip irrigation hose according to the construction described above with respect to FIGS. 19 and 19a, although it will be appreciated that the same method could be used for the other constructions described above wherein the hose is produced by extrusion. Thus, as shown in FIG. 22, an emitter strip 1203 is produced by coextrusion from a first extruder 1261 extruding two strips of the relatively stiff plastic 1261a along the sides of a strip of the thermoplastic elastomeric material 1262a extruded by the second extruder 1262, as shown in FIG. 22a. The so-produced strip is then embossed by embossing wheel 1264 to form the teeth 1245, 1246 as shown in FIG. 22b before the strip 1203 is received within the cross-head of the extruder 1265 which extrudes the plastic hose thereover. The illustrated apparatus may use conventional techniques for shaping the plastic hose extruded by extruder 1265, bonding to its inner surface the emitter strip 1203, and perforating the hose with the outlet openings by perforator 1266.

Preferably, the emitter strip 1203 is extruded and formed with the extrusion of the hose, but can be done separately before the extrusion of the hose.

Figure 23:
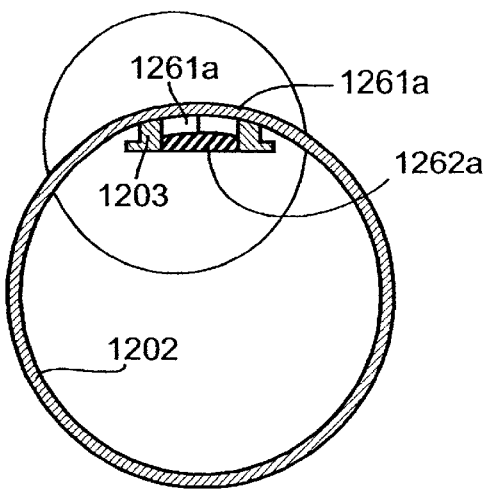
FIGS. 23 and 23a are sectional views, and enlarged fragmentary views, respectively, illustrating the hose made according to the method of FIG. 22.
Figure 23A:
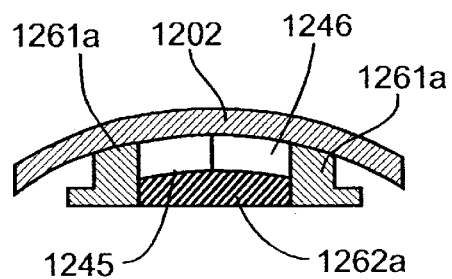

FIGS. 23 and 23a illustrate the resulting structure, including the plastic hose 1202 having the emitter strip 1203 bonded to its inner surface, with the elastomeric layer 1262a of the emitter strip exposed to the water pressure within the hose, so that an increase in the water pressure will press the elastomeric material 1262a into the labyrinth flow path defined by the teeth 1245, 1246 of the stiff plastic material 1261a, to thereby increase the resistance of the flow through the labyrinth, whereas a decrease in the water pressure will act oppositely to decrease the resistance to flow through the labyrinth.

While the invention has been described with respect to several preferred embodiments, it will be appreciated that these are set forth merely for purposes of example, and that many other variations, modifications and applications of the invention may be made.

What is claimed is:

1. A drip irrigation hose, comprising:
   a hose for conducting pressurized water through its interior and formed with a plurality of outlets for discharging the water at longitudinally-spaced locations along the length of the hose;
   and a plurality of emitter elements secured to said hose at longitudinally-spaced locations along its length to define a plurality of turbulent flow passageways each in communication with the interior of the hose for discharging water from a hose outlet at a slow rate:
   characterized in that each of said turbulent flow passageways is defined by a relatively elastic first material coextruded with a relatively stiff second material different from said first material, such that the relatively elastic material is pressure-deformable as compared to the relatively stiff material to change the turbulent flow of each emitter element in response to the pressure of the water in the hose at the respective emitter element.

2. The drip irrigation hose according to claim 1, wherein said hose is made by overlapping opposed longitudinal portions of thin, flexible sheet material, and welding them together with said coextruded relatively elastic material and said relatively stiff material in-between to define a seamed hose incorporating said two materials in the seam.

3. The drip irrigation hose according to claim 2, wherein said welded overlapping portions of the seam further include a plurality of teeth defining said turbulent flow passageway, and a rib laterally of said teeth, said rib being of said relatively stiff material, and said teeth being deformable and made of said relatively elastic material.

4. The drip irrigation hose according to claim 3, wherein said rib is of approximately the same height as said teeth when non-deformed, and the overlying portion of the hose is formed with a slack between said rib and said teeth to permit the pressurized water to apply a tangential force to the overlapping portions of the seam, and thereby to change the shape of the turbulent flow passageways defined by said teeth.

5. The drip irrigation hose according to claim 3, wherein said rib is of less height than said teeth when non-deformed thereby permitting the pressurized water to apply a tangential force to the overlapping portions of the seam and to change the shape of the turbulent flow passageways defined by said teeth.

6. The drip irrigation hose according to claim 2, wherein said welded overlapping portions of the seam include a plurality of teeth made of said relatively stiff material, and a strip of said relatively elastic material at least partly underlying said teeth.

7. The drip irrigation hose according to claim 2, wherein said welded overlapping portions of the seam include a plurality of teeth constituted of an inner layer of said relatively elastic material, and an outer layer of said relatively stiff material.

8. The drip irrigation hose according to claim 2, wherein said welded overlapping portions of the seam include a plurality of teeth with, at least the tips of said teeth made of said relatively elastic material.

9. The drip irrigation hose according to claim 2, wherein said overlapping portions of the seam include a plurality of teeth having one side made of said relatively stiff material, and the other side made of said relatively elastic material.

10. The drip irrigation hose according to claim 1, wherein said relatively stiff material is polyethylene, and said relatively elastic material is a thermoplastic elastomer.

11. The drip irrigation hose according to claim 1, wherein said hose is a continuous unseamed hose, and said plurality of emitter elements include a plurality of teeth carried by a base strip welded to the inner surface of said hose and defining said turbulent flow passageways.

12. The drip irrigation hose according to claim 11, wherein said base strip also includes a rib of a relatively stiff material welded to the inner surface of said hose.

13. The drip irrigation hose according to claim 12, wherein said rib is of approximately the same height as said teeth, and said hose is formed with a slack between said rib and said teeth to permit the pressurized water to apply a tangential force to said teeth and thereby to change the shape of said turbulent flow passageways.

14. The drip irrigation hose according to claim 12, wherein said rib is of less height than said teeth such as to permit the pressurized water to apply a tangential force to said teeth and thereby to change the shape of said turbulent flow passageways.

15. The drip irrigation hose according to claim 1, wherein said relatively elastic material is at least partly formed with a plurality of openings serving as filtering inlets to said turbulent flow passageways.

16. The drip irrigation hose according to claim 1, wherein said relatively elastic material is located as discrete elements at longitudinally spaced locations of the hose.

17. The drip irrigation hose according to claim 1, wherein said relatively elastic material is pressure-deformable at least in the radial direction by the pressurization of the water therein to provide pressure-compensation of the water discharge rate from each respective outlet.

18. The drip irrigation hose according to claim 17, wherein said relatively stiff material is in the form of teeth defining said turbulent flow passageways, and said relatively elastic material is in the form of a layer underlying said teeth.

19. The drip irrigation hose according to claim 17, wherein said hose is made by overlapping opposed longitudinal portions of a thin, flexible sheet material, and welding them together.

20. The drip irrigation hose according to claim 17, wherein said hose is a continuous unseamed hose.

21. A drip irrigation hose, comprising:
   a hose for conducting pressurizing water therethrough and formed with a plurality of longitudinally spaced outlets for discharging water therefrom;
   and a plurality of emitter elements at least partly made by extrusion, and at least partly made of relatively elastic material different from that of the hose, defining a plurality of restricted flow passageways to said plurality of hose outlets for discharging water from each outlet at a slow discharge rate;
   said hose being constructed such that when the water within the hose is pressurized, the pressurized water tautens the hose to change the shape of said restricted flow passageways at least in the tangential direction, to decrease the sensitivity of the water discharge rate from each outlet to changes in pressure of the water within the hose.

22. The drip irrigation hose according to claim 21, wherein said hose is formed with a longitudinally-extending rib laterally of said emitter elements and with a slack between said rib and said emitter elements to permit the pressurized water to take up the slack and to apply a tangential force to the emitter elements.

23. The drip irrigation hose according to claim 22, wherein said hose is a seamed hose made of a flexible sheet having overlapping portions welded to each other to define a seam incorporating said rib and said emitter elements.

24. The drip irrigation hose according to claim 22, wherein said hose is a seamless hose and includes said rib and said emitter elements carried by a base strip welded to the inner strips of said hose.

25. The drip irrigation hose according to claim 21, wherein said relatively elastic material is at least partly formed with a plurality of openings serving as filtering inlets to said restricted flow passageways which, upon the taughtening of the hose, changes their shape.

26. The drip irrigation hose according to claim 21, wherein each of said emitter elements includes a plurality of teeth defining turbulent flow passageways for the water from the interior of said hose to each of its outlets.

27. The drip irrigation hose according to claim 26, wherein said plurality of teeth are made of said relatively elastic material.

28. The drip irrigation hose according to claim 26, wherein at least the tips of said teeth are made of said relatively elastic material.

29. The drip irrigation hose according to claim 21, wherein said relatively elastic material is located at discrete longitudinally-spaced locations of the hose.

30. A method of making a drip irrigation hose, comprising:
   coextruded at least one strip of a relatively stiff first material and at least one strip of a relatively elastic second material different from said first material;
   and forming at least one of said strips into at least a part of a plurality of emitter elements at longitudinally-spaced locations to produce a hose having said plurality of emitter elements welded thereto for discharging water from the hose at a slow rate.

31. The method according to claim 30, wherein at least a part of said coextruded strip of relatively elastic material is formed into teeth constituting said plurality of emitter elements.

32. The method according to claim 31, wherein said hose is formed with a slack to permit the hose to tauten by the pressurized water and to apply a tangential force to deform said emitter elements and to change the shape of said turbulent flow passageways.

33. The method according to claim 30, wherein said strip of relatively stiff material at least partly underlies said teeth.

34. The method according to claim 30, wherein said strips are formed into said teeth and at least the tips of the teeth are of relatively elastic material.

35. The method according to claim 30, wherein said relatively stiff material is polyethylene, and said relatively elastic material is a thermoplastic elastomer.

36. The method according to claim 30 wherein said substrate on which strips are coextruded is one edge of a flexible sheet which edge is overlapped with and bonded to an opposite edge of the flexible sheet to produce a seamed hose with said emitter elements welded within said seam.

37. The method according to claim 36, wherein one edge of the flexible sheet is engaged by a rotary wheel to produce a slack in said one edge before said one edge is bonded to the opposite edge.

38. The method according to claim 36, wherein two strips of relatively stiff material are coextruded on opposite sides of said strip of relatively elastic material.

39. The method according to claim 36, wherein two strips of relatively stiff material are coextruded on opposite sides of two strips of relatively elastic material.

40. The method according to claim 36, wherein at least one strip of relatively stiff material and at least one strip of relatively elastic material are coextruded, one above the other.

41. The method according to claim 36, wherein the extrusion of at least a portion of said relatively elastic material is interrupted during said coextrusion with the relatively stiff material.

42. The method according to claim 30, wherein said strips are coextruded through a common cross-head and are welded to the inner face of a seamless hose.

43. The method according to claim 42, wherein two strips of relatively stiff material are coextruded on opposite sides of said strip of relatively elastic material.

44. The method according to claim 42, wherein two strips of relatively stiff material are coextruded on opposite sides of two strips of relatively elastic material.

45. The method according to claim 42, wherein at least one strip of relatively stiff material and at least one strip of relatively elastic material are coextruded, one above the other.

46. The method according to claim 42, wherein the extrusion of at least a portion of said relatively elastic material is interrupted during said coextrusion with the relatively stiff material.

47. The method according to claim 30, wherein the coextrusion of at least said relatively elastic material is non-continuous, and is interrupted between said longitudinally-spaced locations of the hose.

48. A method of making a drip irrigation hose having a plurality of emitter elements secured to the hose at longitudinally-spaced locations along the length of the hose to define a plurality of turbulent flow passageways for discharging water from a hose outlet at a slow rate;

characterized in that at least a part of the emitter elements are produced by extruding intermittently individual strips of a relatively elastic material, and applying said individual strips at said longitudinally-spaced locations along the length of the hose.

49. The method according to claim 48, wherein said relatively elastic material is shaped to define at least a part of a toothed labyrinth.

50. The method according to claim 48, wherein said hose is a seamed hose, and said emitter elements are formed with a plurality of teeth welded to the inner surface of the hose to define said turbulent flow passageways.

51. The method according to claim 48, wherein said hose is a continuous unseamed hose, and said emitter elements are formed with a plurality of teeth welded to the inner surface of the hose to define said turbulent flow passageways.

* * * * *